United States Patent [19]

Schwebke

[11] 4,176,825
[45] Dec. 4, 1979

[54] JACK DEVICE FOR TRAILERS

[76] Inventor: Donald D. Schwebke, Box 302, Hampton, Iowa 50441

[21] Appl. No.: 874,147

[22] Filed: Feb. 1, 1978

[51] Int. Cl.² .............................................. B66F 7/22
[52] U.S. Cl. ...................................................... 254/94
[58] Field of Search ..................... 254/86 H, 86 R, 45, 254/94

[56] References Cited

U.S. PATENT DOCUMENTS

| | | | |
|---|---|---|---|
| 2,837,312 | 6/1958 | Troche | 254/86 H |
| 3,744,757 | 7/1973 | White et al. | 254/94 |
| 3,951,383 | 4/1976 | Tenney | 254/94 |

Primary Examiner—Robert C. Watson
Attorney, Agent, or Firm—Williamson, Bains, Moore & Hansen

[57] ABSTRACT

A jack device for boat trailers and the like includes a bracket which is attached to the trailer frame or trailer bed. An extensible and retractable telescoping leg pivoted on the bracket and has a length greater than the radius of the trailer wheel. When the leg is swung downwardly from a transport position to a lowered position, and the trailer is then moved, the leg will be pivoted and extended to a vertical load supporting position to support the trailer so that the wheel is elevated above the ground surface. Conversely, when the leg is swung to the transport position, a spring telescopically retracts the leg in the lowered load supporting position. A foot member pivoted to the leg assures planar contact of the leg with the ground surface.

11 Claims, 4 Drawing Figures

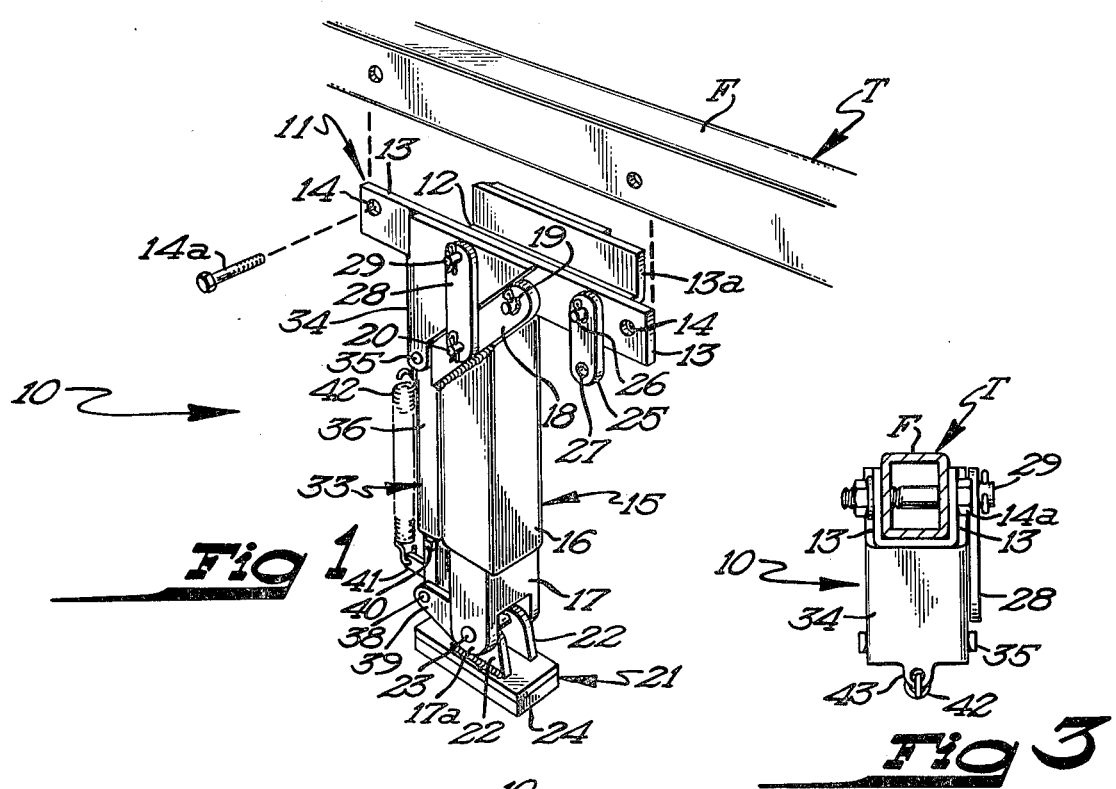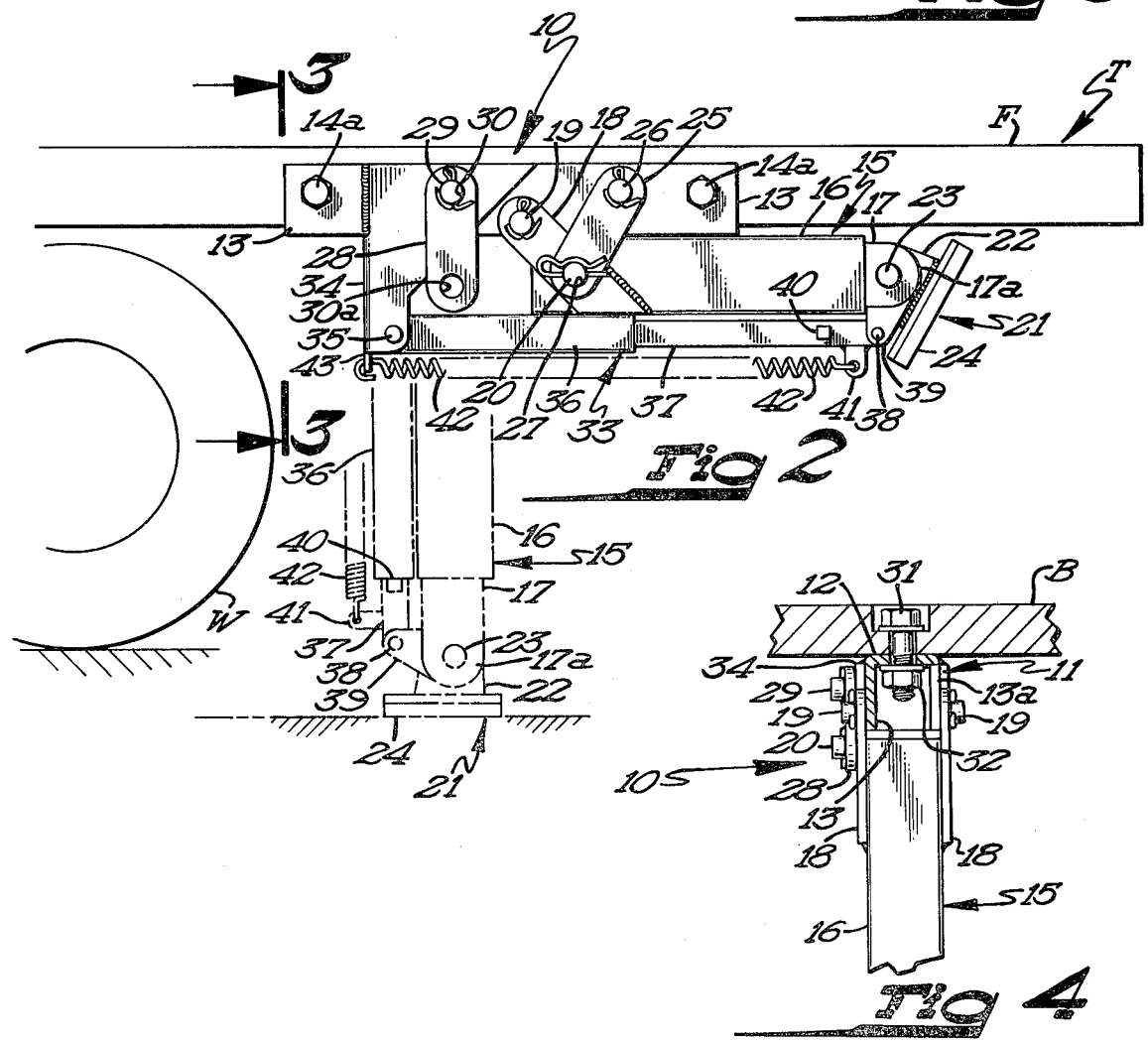

JACK DEVICE FOR TRAILERS

SUMMARY OF THE INVENTION

This invention relates to trailer jacks and more particularly to a trailer jack which is shifted to an operable load supporting position in response to movement of the trailer.

An object of this invention is to provide a novel trailer jack which is readily shiftable from a transport position to a lowered position whereby upon movement of the trailer, the jack device is shifted to a vertical load supporting position for supporting the wheel above the surface of the ground.

A more specific object of this invention is to provide a novel trailer jack including a telescopically extensible and retractable leg structure having a pivoted foot element on the lower end thereof, the leg structure being urged into an extended position when pivoted to the lowered vertical load supporting position and being telescopically retracted when swung to the transport position to thereby provide a safe and positive means for elevating a trailer wheel above the ground surface.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a perspective view of a portion of a trailer incorporating my novel jack device, the latter being illustrated in a lowered load supporting position;

FIG. 2 is a side elevational view of a portion of a trailer illustrating the jack device in a raised transport position;

FIG. 3 is a cross-sectional view of the jack taken approximately along line 3—3 of FIG. 2 and looking in the direction of the arrows; and FIG. 4 is an end elevational view of the jack device in a lowered operative position and illustrating the manner in which the jack device may be attached directly to the bed of a trailer.

DESCRIPTION OF THE PREFERRED EMBODIMENT OF THE INVENTION

Referring now to the drawings and more specifically to FIG. 1, it will be seen that one embodiment of the novel jack device, designated generally by the reference numeral 10, is thereshown. The jack device 10 includes a generally channel shaped bracket 11 comprised of a web 12 and flanges 13 and 13a affixed thereto and extending therefrom. It will be noted that one flange 13a of channel 11 is much shorter than the other flange 13. The channel bracket 11 is adapted to be secured to the frame F of a trailer T, the latter being a conventional boat trailer. It is pointed out that the jack device 10 is especially adapted for small trailers, such as boat trailers, snowmobile trailers or the like. It is further pointed out that two such jack devices 10 will be provided and each will be secured to the trailer and will be positioned adjacent one of the wheels W of the Trailer T. In this respect, the jack device 10 may be applied to the frame members F of the trailer T either rearwardly or forwardly of the ground engaging wheels W.

When applied to the frame of a trailer, the channel shaped bracket will be positioned to embrace the frame member F so that the web 12 engages the lower surface of the frame member and the flanges 13 and 13a engage the longitudinal surfaces of the frame member. The flange 13 is provided with an opening 14 therein through which the bolts 14a of nut and bolt assemblies extend, the frame member F also being provided with openings which are disposed in registering relation with the openings 14.

When the bracket 11 is applied directly to the bed of a trailer, as shown in FIG. 3, it will be seen that the mounting bracket 11 will be inverted to position the web 12 in an upward position against the lower surface of a bed B of a trailer T. A bolt 31 will project through an opening in the bed B and will be secured in place by a lock nut 32 to clamp the bracket thereto. It will be therefore seen that the jack device 10 may be secured to the frame of a trailer or may be secured to a trailer bed in the event the trailer does not include a frame or chassis.

The jack device 10 also includes an elongate leg structure 15 comprised of an elongate, generally rectangular upper shaped leg member 16 and an elongate generally rectangular shaped lower leg member 17 extending telescopically into the upper leg 16 and being longitudinal extensible and retractable relatively thereto. An elongate, substantially flat strap 18 is fixedly or otherwise rigidly attached to the upper end portion of the upper leg member 16 nad projects obliquely therefrom as best seen in FIG. 1. The strap 18 is pivotally mounted on a pivot pin 19 to permit for and aft swinging of the leg structure 15 about a horizontal transverse axis. A locking pin 20 is fixed to the other end portion of the strap 18 and projects outwardly therefrom.

The leg structure also includes a foot member 21 which is of flat rectangular construction and provided with a pair of spaced apart ears 22 fixed to the upper surface thereof and projecting upwardly therefrom. The ears 22 are each provided with an opening therein through which projects a pivot pin 23 which extends through openings in a pair of ears 17a on the lower end of the lower leg member 17. Thus, the foot member 21 is mounted on the lower end of the lower leg member 17 for pivotal movement relative thereto. A generally rectangular shaped, flat anti-skid pad 24, formed of rubber or the like, is secured to the lower surface of the foot member 21 by glue or other suitable securing means. The pad serves to prevent or minimize skidding of the leg structure relative to the ground surface upon which it is supported when the leg structure is shifted to the vertical load supporting position. Means are provided for extending and retracting the leg structure 15 during movement of the leg structure between the transport and the vertical load supporting positions. This means includes an elongate motion-transmitting link member 33 which is pivotally connected at one end to a bracket 34 by means of a pivot 35. The bracket 34 is secured to the flanges 13 and 13a of the channel member 11 and projects downwardly therefrom.

The motion-transmitting link member 33 includes an upper elongate generally rectangular shaped link 36 and an elongate rectangular shaped lower link 37 telescopically extending to the upper link 36 and projecting outwardly therefrom. The lower or outer end of the lower link 37 is pivotally connected by a pivot 38 to a pair of ears 39 which are secured to the lower end of the lower leg member 17.

The lower link 37 is provided with a stop element 40 affixed to the lower end thereof and projecting outwardly therefrom to limit retractive movement of the lower link relative to the upper link 36. The lower link 37 is also provided with an attachment ear 41 adjacent its lower end to which is connected one end of an elongate helical spring 42, the other end of spring 42 being connected by a tab 43 secured to the bracket 34.

Means are also provided for releasably locking leg structure 15 in an upper or transport position, as illustrated in FIG. 2. This means includes an elongate, locking link 25 which has one end thereof pivotally mounted on one end of the bracket by a pivot pin 26, the latter projecting outwardly from the bracket. The pivot pin 26 is provided with an opening therethrough for receiving a cotter pin for retaining the locking link in mounted relation on the bracket. The other end of the locking link 25 is provided with an opening 27 therein which is adapted to engage the locking pin 20 when the leg structure is in the raised transport position, as best seen in FIG. 2. Again, it is pointed out that a suitable cotter pin will extend through an opening in the outer end of the locking pin 20 to releasably lock the locking link 25 in place.

The jack device is also provided with a second locking link 28 for releasably locking the leg structure 15 in a lowered load supporting position. The locking link 28 is also of elongate, flat construction and is pivotally mounted on the outer flange 13 of the bracket 11 by means of a pivot pin 29. The pivot pin 29 also is provided with an opening therethrough for accommodating a cotter pin therein to retain the locking link 28 in place. The other end of the locking link 28 is provided with an opening 30 therethrough which is adapted to be positioned over the locking pin 20 when the leg structure 15 is in a lowered load supported position.

In use, the two jack devices mounted on opposite side portions of the trailer T will normally be retained in a raised transport position as shown in FIG. 2. In that position, the locking link 25 will engage the locking pin 20 on the leg structure 15 to releasably hold the leg structure in this elevated position. The link 28 is preferably of a length to thereby permit the opening 30 to position around the pivot pin 19 when the leg structure is in the raised transport position. It will also be noted that the motion-transmitting link will be in an extended position. However, when it is desirable to use one or both of the jack devices 10, the locking link 25 will be disengaged from the locking pin 20 whereby the leg structure 15 will swing downwardly by action of the spring 42. When this occurs, the leg structure will be disposed in an inclined relation with respect to the horizontally disposed trailer and the trailer wheel 18 will remain in engagement with the ground surface. The motion-transmitting link will be retracted whereby the lower edge of the upper link will engage the stop element 40 on the lower link 37. However, upon movement of the trailer, the leg structure 15 will be shifted from the inclined position to a vertical load supporting position to elevate the associated ground engaging wheel W above the surface of the ground. When the leg structure is shifted from its inclined position to the final vertical position, the motion-transmitting link will extend the leg structure. The locking link 28 will then be positioned so that the opening 30 will receive the locking pin 20 thereby locking the leg structure in the lowered vertical load supporting position. The foot element 21 will be maintained in planar contact with the ground surface because of its pivotal connection with the leg structure thereby providing a self-leveling feature.

The direction of movement of the trailer will be dependent on the location of the jack device relative to the ground engaging wheels of the trailer. For example, if the jack device is located rearwardly of the ground engaging wheels W and is swung rearwardly as, is shown in FIG. 2, from the lowered load supporting position to the transporting position, then the trailer must be moved rearwardly to shift the jack device from an inclined position to the vertical load supported position. Conversely, if the jack device is mounted forwardly of the ground engaging wheels W of the trailer T, and the leg structure is moved forwardly and upwardly from the lowered position to the transport position, then the trailer will be moved forwardly to shift the leg structure from the inclined position to the vertical load supporting position.

The jack device 10 provides a readily available means for elevating the trailer wheels for changing tires or for storing the trailer during periods of non-use. The use of the locking links provides positive retention of the leg structure in either the lowered load supporting position or the transport position. The extensible and retractable leg along with the pivoted foot accommodates a wide range of trailer sizes but assures planar contact of the leg structure with the ground surface even though the latter may be slightly irregular. Finally, the use of a bracket which may be readily inverted to permit mounting of the jack devices on trailer beds as well as trailer frames permits a wider use of my jack device than prior art jack devices for trailers.

From the foregoing description, it will be seen that I have provided a novel jack device which is especially adapted for small trailer structures such as boat trailers, snowmobile trailers and the like.

It will further be seen that my novel jack device, is not only of simple and inexpensive construction, but functions in a more efficient manner than any heretofore known comparable jack device.

What is claimed is:

1. A jack device for trailers having a frame and having ground engaging wheels, comprising:
   a bracket attached to the trailer,
   an elongate leg structure including an upper leg member and a lower leg member projecting telescopically into said upper leg member, said lower leg member being extensible and retractable relative to said upper leg member, means pivotally mounting said leg structure on said bracket for swinging movement relative thereto between lowered load supporting position and a raised transport position, said leg structure when in the transport position being supported on the frame above the surface of the ground, and when in the lowered load supporting position being disposed in substantially vertical ground engaging relation and supporting the trailer whereby the adjacent trailer wheel is elevated above the surface of the ground,
   an elongate motion-transmitting link member having one end thereof connected to said bracket having the other end thereof connect to said lower leg member, said motion-transmitting link member including an upper link and a lower link and being extensible and retractable relative thereto,
   said motion-transmitting link member causing said lower member to be extended when said leg structure is shifted from the transport position to the lowered load supporting position, means operatively connected with said leg structure yieldably resisting movement thereof to the transport position, and a foot member having a flat lower surface and being pivotally mounted on the lower end of said leg structure for pivotal movement relative thereto whereby said foot member will be maintained in planar contact with the ground surface when the foot member engages the ground surface.

2. The jack device as defined in claim 1 and stop means on said lower link being engagable with said upper link to limit retractive movement of said lower link relative to said upper link.

3. The jack device as defined in claim 1 wherein said spring means is connected to said lower link and said bracket.

4. The jack device as defined in claim 1 wherein a locking link on said bracket being releasably engagable with said leg structure to lock the same in said transport position.

5. The jack device as defined in claim 4 and a second locking link on said bracket being releasably engagable with said leg structure to lock the leg structure in the load supporting position.

6. The jack device as defined in claim 4 wherein said motion-transmitting link member includes an upper link and a lower link projecting into said upper link and being extensible and retractable relative thereto.

7. The jack device as defined in claim 6 and stop means on said lower link being engagable with said upper link to limit retractive movement of said lower link relative to said upper link.

8. The jack device as defined in claim 7 wherein said spring means is connected to said lower link and said bracket.

9. A jack device for trailers having a generally horizontally oriented frame and having ground engaging wheels, comprising:

an elongate, channel-shaped bracket including a web having a pair of flanges extending in substantially right angular relationship therefrom, one of said flanges having a length dimension greater than the length dimension of the other flange, means securing the bracket to the trailer frame to position the web of the bracket in substantially horizontal relation, an elongate leg structure including an upper leg member and a lower leg member projecting telescopically into said upper leg member, said lower leg member being extensible and retractable relative to said upper leg member, means pivotally mounting said leg structure on said bracket for swinging movement relative thereto between a lower load supporting position and a raised transport position, said leg structure when in a transport position being substantially horizontally oriented and supported on the frame above the surface of the ground, and when in the lower load supporting position being disposed in substantially vertical ground engaging relation and supporting the trailer whereby the adjacent trailer wheel is elevated above the surface of the ground, a first elongate locking link having one end thereof pivotally connected with said brackets and having its other end engagable with said leg structure to releasable lock the latter in a transport position, an elongate second locking link having one end thereof pivotally connected with said bracket and having the other end thereof engageable with said leg structure to releasably lock the latter in the load supporting position.

10. The jack device as defined in claim 9 wherein said pivot connections of said locking links are spaced from the pivot connection of said leg structure.

11. The jack device as defined in claim 9 wherein said means securing the bracket to the trailer frame engages only said longer flange of the bracket and the trailer frame.

* * * * *